May 20, 1941.   G. QUAYLE   2,242,436
INDUSTRIAL TRUCK
Filed Jan. 14, 1938   2 Sheets-Sheet 1
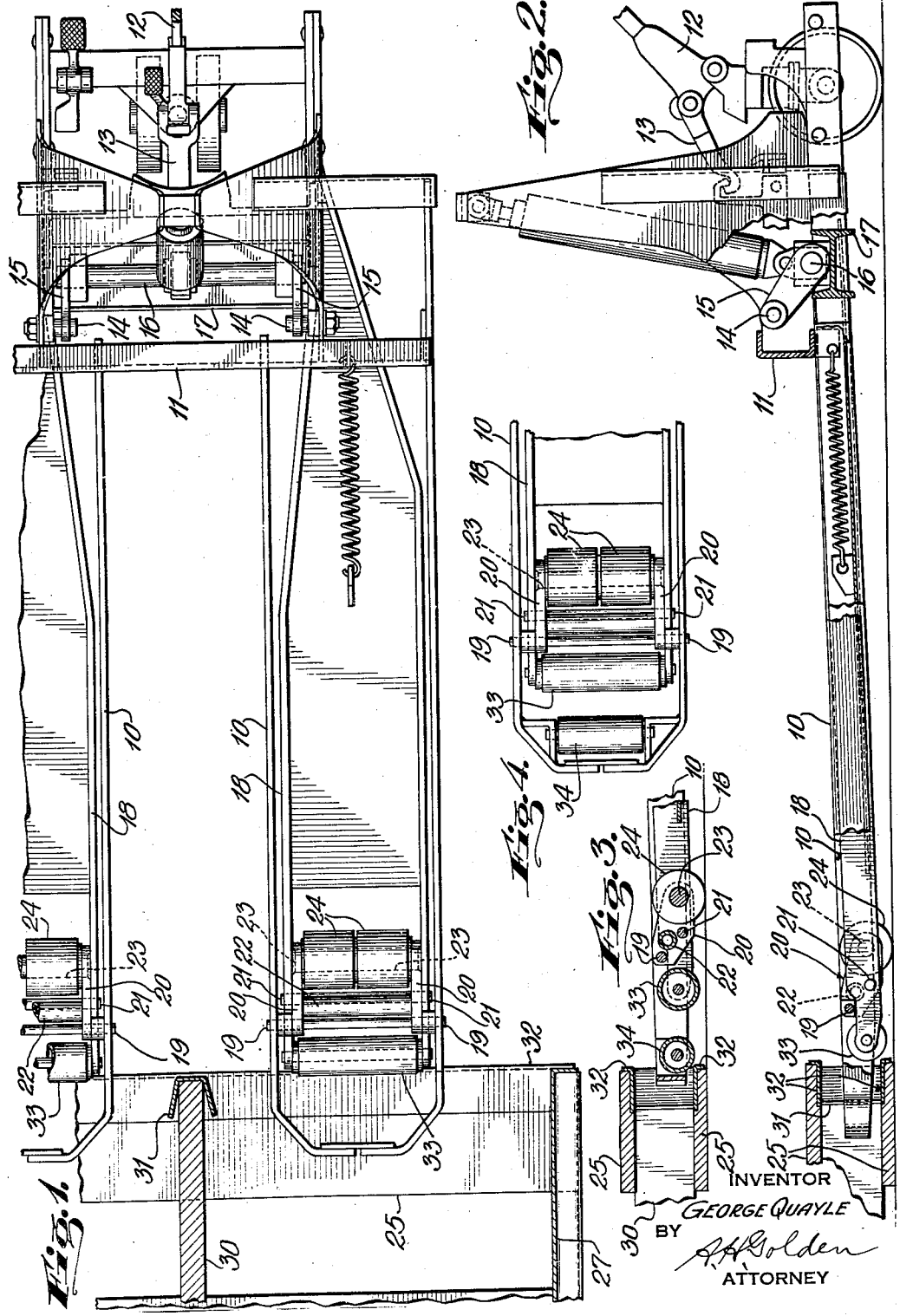
INVENTOR
GEORGE QUAYLE
BY
A. A. Golden
ATTORNEY May 20, 1941.　　　G. QUAYLE　　　2,242,436
INDUSTRIAL TRUCK
Filed Jan. 14, 1938　　　2 Sheets-Sheet 2
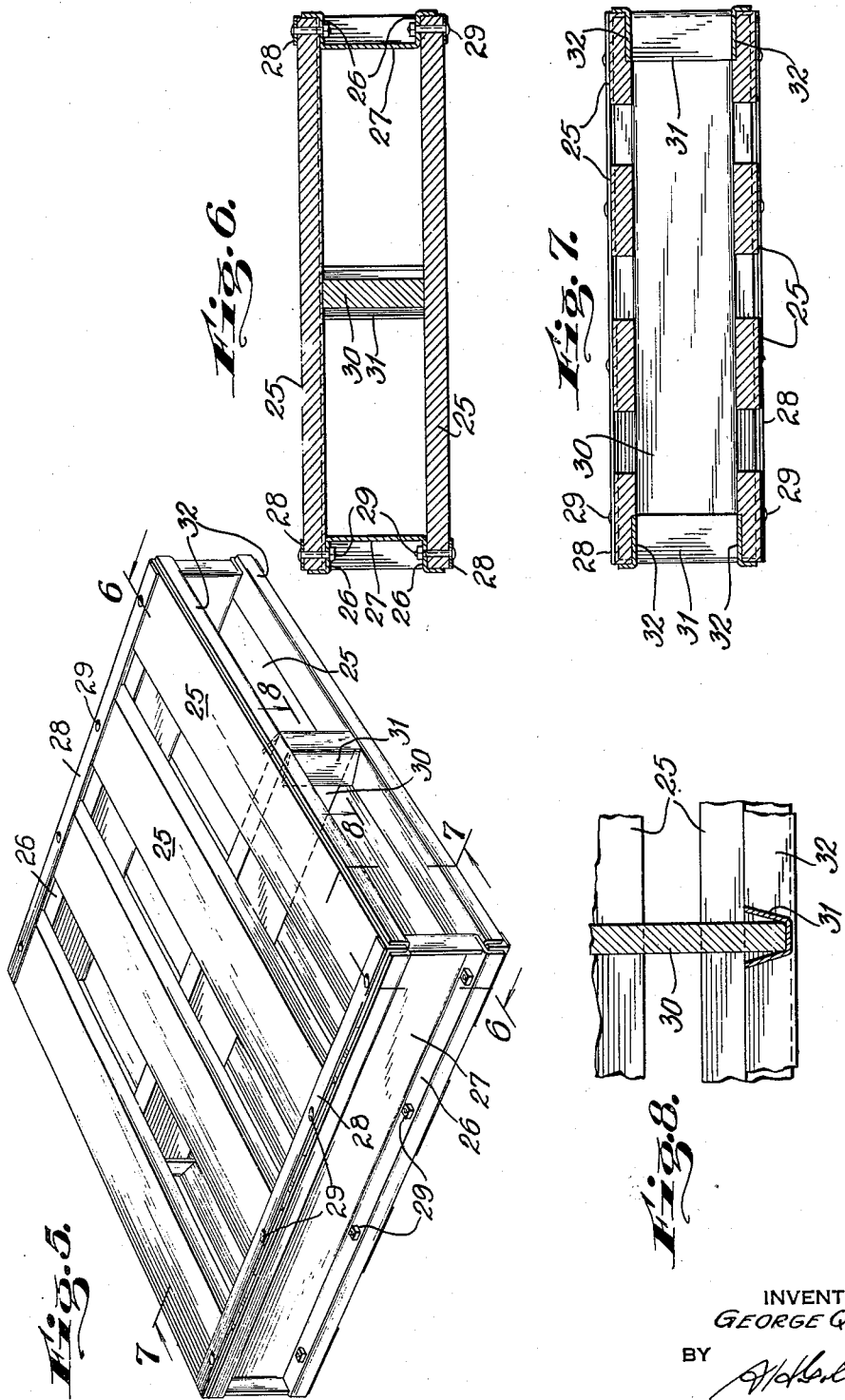
INVENTOR
GEORGE QUAYLE
BY
ATTORNEY Patented May 20, 1941

2,242,436

UNITED STATES PATENT OFFICE 2,242,436

INDUSTRIAL TRUCK

George Quayle, Philadelphia, Pa., assignor to The Yale & Towne Manufacturing Company, Stamford, Conn., a corporation of Connecticut Application January 14, 1938, Serial No. 184,918

2 Claims. (Cl. 280—49)

This invention relates to industrial trucks of the type adapted to elevate a skid platform upon the lifting of an elevating frame forming part of the truck. More particularly, my invention relates to a hand lift truck adapted for use with a form of reversible skid platform, called in the trade a reversible pallet.

The novel feature of my truck embodies means to facilitate the movement of the truck into proper lifting relation to a reversible pallet. My invention includes also the structural features of a reversible pallet particularly adapted for cooperation with an industrial truck of the type set forth, although its use is not necessarily confined to the particular truck herein to be described. This reversible pallet is covered in my application Serial No. 277,249, filed June 3, 1939.

Reversible pallets comprise upper and lower platforms maintained with a space therebetween by structural members positioned between the upper and lower platforms. In order to lift and carry away a reversible pallet on which is stacked a load, an industrial truck must move into the space between the upper and lower platforms of the pallet and to a point beyond the pallet, so as to bring the forward wheels of the truck off the lower platform and on to the ground. Thereafter, the pallet may be lifted by the lifting of the elevating frame of the truck, and moved to a desired location. By then lowering the elevating frame, the pallet is moved into contact with the ground, whereupon the truck may be withdrawn.

I have found that it is very difficult to move a truck over the obstruction presented by the lower platform of a reversible pallet, especially since in moving the truck in the particular direction, the lever handle with which the truck is moved is usually in an upright position, in which position force may not be effectively applied thereto.

By placing rollers on either the main frame or the elevating frame, or on both frames, in a position in advance of the rear wheels of the main frame, and with the rollers somewhat spaced from the ground, I facilitate the movement of the truck over the obstruction presented by the lower pallet platform, as will be better understood when I describe my invention in detail. This feature is the important contribution of my invention to the art. The reversible pallet of my invention is of a construction particularly adapted to cooperate with the truck just described by me generally, while being usable also with other types of trucks, and the construction of my pallet I consider an important part of my contribution to the art.

I shall now refer to the drawings wherein is shown a preferred form of my invention. In the drawings, Fig. 1 is a view looking downwardly on a part of a truck embodying my invention, and showing the truck just about to move onto the inner surface of the lower platform of the reversible pallet. Fig. 2 is a partial elevation and section of a truck in the same position as in Fig. 1. Fig. 3 illustrates a modified form of my invention, while Fig. 4 is a plan view of the truck portion shown in Fig. 3. Fig. 5 is a perspective view of a preferred form of reversible pallet forming part of my invention. Fig. 6 is a section along lines 6—6 of Fig. 5, while Figs. 7 and 8 are sections along lines 7—7 and 8—8 respectively, of Fig. 5.

Referring now more particularly to the drawings, the truck to which my invention is applied is of the same type as shown in my Patent No. 2,093,392, issued on September 14, 1937. The actual lifting means used by me to lift the elevating frame are somewhat different from that shown in my patent supra, and are of a type shown in the Stuebing patent, No. 1,885,649. Since my invention is applicable to practically any type of truck, and since the particular type shown by me is well known and already described in prior patents, I shall not describe in detail its construction.

It will be well to indicate, however, that my truck is of a type known as a U frame truck, and has a U shaped elevating platform formed of two legs 10 united at the head or forward end of the truck by a cross bar 11. In the hand lift truck industry, the head or forward end of the truck is the end which carries the lifting mechanism, the load or rear end of the truck being the portion that first moves under the load.

The two portions 10 comprising the U elevating frame are themselves U shaped, and are lifted by the operation of a steering and lifting lever 12, through a lifting hook 13, all as set forth in the patents referred to. The forward end of the U shaped elevating frame is pivoted at 14 to links 15, which links are in turn pivoted at 16 to the main frame 17. The main frame has a pair of U portions 18 corresponding to the U portions 10 of the elevating frame, these portions 18 being united at the forward end of the truck and supporting the lifting mechanism and steering head.

At their rear ends, each of the U portions 10 is pivotally connected at 19 to a pair of links 20, which links 20 are pivoted at points 21 on the main frame 18. A cross bar 22 connects each pair of links 20 and reinforces those links. At their ends opposite the ends pivoted at 19 to the elevating frame, each pair of links 20 carries a shaft 23, on which are rotatably mounted wheels 24.

It will now be appreciated that the elevating frame moves upwardly and forwardly through the links 15 when the said frame is actuated by lifting lever 12 and hook 13. The elevating frame will also move through pivots 19 and links 20 relatively to the pivot points 21 on the main frame. At the same time, the wheels 24 will move with the links 20 so as to elevate the main frame portions 18. In this way, the main frame portions 18 are elevated at the same time as is the elevating frame. This construction is practically a duplicate of that shown in my earlier Patent No. 2,093,392 except that in that earlier patent I use pairs of wheels spaced longitudinally instead of the type of wheels 24 shown herein.

The reversible pallet with which my truck is adapted to cooperate is best shown in Figs. 5–8, inclusive. There it will be seen that the upper and lower platforms are formed of a series of wood boards 25 held at their sides in spaced relation by upper and lower flanges 26 of a structural steel member 27. Steel binding members 28 cover the outer edges of the upper and lower floor members, and through these members 28 the floor members 25 are secured to the structural members 27 by a series of bolts 29 passing through the flanges 26 of the structural members 27 and the said outer binding members 28. Naturally, the structural members 27 and 28 may assume various forms for embracing the ends of the floor boards.

Medially of the reversible pallet and longitudinally thereof, extends a wood beam 30 which is protected at its ends by metal members 31 welded to the upper and lower steel angle irons 32, which are maintained in position to protect the edges of the forward and rearward wood floor members 25. These angle irons 32 may be welded to the structural members 27 if desired, thereby to strengthen the pallet.

It will be appreciated that in order for the truck of Figs. 1 and 2 to elevate the reversible pallet of Fig. 5, the truck must move between the upper and lower floors of the pallet formed by the boards 25, to a point wherein the wheels 24 will be positioned beyond the pallet, or in one of the several spaces between the floor boards 25 shown in Fig. 7. Thereafter, the elevation of the main and elevating frames will lift the pallet so that it may be transported.

For permitting the truck to move up on the boards 25 of the lower platform and over the lower edge covering angle iron 32, I provide my truck with rollers spaced in advance of the load wheels. In Figs. 1 and 2, I show one such roller 33 maintained on the main frame and spaced somewhat from the floor. It will be obvious from viewing Fig. 2 that the roller 33 will first contact the metal angle member 32 of the reversible pallet, and will act to elevate the main frame U portions 18. Thereafter, when the wheels 24 contact the angle iron 32, the lifting movement to be contributed by the said wheels 24 is minimized considerably, so that the truck will move with ease up on to the floor boards 25.

A further function of the roller 33 is to prevent the wheels 24 from dropping far into the spaces between the boards 25 as the truck enters the reversible pallet, also to assist in the withdrawal of the truck. In such cases where there are relatively wide spaces between the boards, the roller 33 will assist in lifting the wheels 24 over each of the boards.

In Figs. 3 and 4, I show a modification of my invention in which I use additional rollers 34 mounted on the elevating frame, the rollers 33 being preferably retained on the main frame. However, the rollers 33 may in many cases be dispensed with. In the construction of Figs. 3 and 4, the roller 34 acts to impart a slight lift to the entire truck, while the roller 33 imparts a greater lift. Thus, the wheels 24 are required to elevate the truck but very little when the said wheels encounter the forward angle irons 32 of the reversible pallet.

I now claim:

1. In a truck of the class described, a U main frame whereby said truck may straddle the central structural member of a pallet or skid, supporting wheels for each leg of said U frame, and a roller positioned on each of said U main frame legs rearward of each of said supporting wheels, and with the horizontal planes tangential to the lowermost peripheral points of said rollers spaced vertically above the planes correspondingly related to the supporting wheels, said rollers being adapted to assist in lifting said truck over an obstruction prior to the engagement of said wheels with said obstruction, an elevating frame superimposed on each of the legs of said U frame, and a roller on each of said elevating frames related to said main frame rollers as said main frame rollers are related to said supporting wheels.

2. In a truck of the class described, a main frame, supporting wheels for said main frame, a roller positioned on said main frame rearward of said supporting wheels, and with the horizontal plane tangential to the lowermost peripheral point of said roller spaced vertically above the plane correspondingly related to the supporting wheels, said roller being adapted to assist in lifting said truck over an obstruction prior to the engagement of said wheels with said obstruction, an elevating frame supported on said main frame for lifting movement relatively thereto, and a roller on said elevating frame related to the roller on said main frame as the said roller on said main frame is related to said supporting wheels, substantially for the purpose described.

GEORGE QUAYLE.